United States Patent
Shiraishi

(10) Patent No.: US 8,842,328 B2
(45) Date of Patent: Sep. 23, 2014

(54) IMAGE PROCESSING DEVICE

(71) Applicant: Naoto Shiraishi, Kanagawa (JP)

(72) Inventor: Naoto Shiraishi, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 60 days.

(21) Appl. No.: 13/633,464

(22) Filed: Oct. 2, 2012

(65) Prior Publication Data

US 2013/0094037 A1    Apr. 18, 2013

(30) Foreign Application Priority Data

Oct. 12, 2011 (JP) ................ 2011-225237

(51) Int. Cl.
H04N 1/40 (2006.01)
G06K 15/02 (2006.01)
G06T 11/60 (2006.01)

(52) U.S. Cl.
CPC ........ *G06K 15/1849* (2013.01); *G06K 15/1857* (2013.01); *G06T 11/60* (2013.01)
USPC .......................... 358/1.18; 358/1.3

(58) Field of Classification Search
CPC .............. G06K 15/102; G06K 15/181; G06K 9/00442; G06K 9/34; G06K 9/342; G06K 9/346; G06K 9/4638; G06K 2009/2045; G06K 2215/111; G06F 17/30244; G06F 3/14; G06F 3/0481; G06F 3/04883; G06F 3/1284; G06F 3/048; G06F 3/1204; G06F 3/1244; G09G 5/14; G09G 5/393; G06T 11/60
USPC ............ 358/1.9, 2.1, 1.18, 488, 1.3; 382/173, 382/180, 201
See application file for complete search history.

(56) References Cited

U.S. PATENT DOCUMENTS

| | | | | |
|---|---|---|---|---|
| 4,625,288 A | * | 11/1986 | Weiner et al. | 345/621 |
| 5,583,543 A | * | 12/1996 | Takahashi et al. | 345/173 |
| 5,926,188 A | * | 7/1999 | Kawamoto et al. | 345/629 |
| 6,081,274 A | | 6/2000 | Shiraishi | |
| 6,219,149 B1 | * | 4/2001 | Kawata et al. | 358/1.15 |
| 7,576,875 B2 | * | 8/2009 | Momose | 358/1.13 |
| 2003/0063813 A1 | | 4/2003 | Shiraishi | |
| 2004/0150656 A1 | | 8/2004 | Shiraishi | |
| 2005/0062994 A1 | | 3/2005 | Shiraishi | |
| 2005/0207667 A1 | | 9/2005 | Shiraishi | |
| 2005/0246684 A1 | | 11/2005 | Shiraishi | |
| 2009/0128857 A1 | | 5/2009 | Shiraishi | |
| 2010/0238467 A1 | | 9/2010 | Shiraishi | |
| 2011/0033125 A1 | | 2/2011 | Shiraishi | |
| 2011/0063143 A1 | | 3/2011 | Shiraishi | |
| 2013/0107289 A1 | * | 5/2013 | Brodzinski et al. | 358/1.9 |

FOREIGN PATENT DOCUMENTS

| | | |
|---|---|---|
| JP | 2003-208608 | 7/2003 |
| JP | 2004-282239 | 10/2004 |
| JP | 2005-309865 | 11/2005 |
| JP | 2006-121437 | 5/2006 |

* cited by examiner

*Primary Examiner* — Thomas D Lee
*Assistant Examiner* — Stephen M Brinich
(74) *Attorney, Agent, or Firm* — Oblon, Spivak, McClelland, Maier & Neustadt, L.L.P.

(57) ABSTRACT

An image processing device includes a storage unit capable of storing various kinds of images, a first drawing unit to write a source image after subjected to an image processing in the storage unit, a second drawing unit to generate an image and write the generated image in the storage unit, and an analyzing unit to analyze a page drawing command, so that the analyzing unit controls the first drawing unit in accordance with a first drawing command, if the analyzed command is the first drawing command to instruct the first drawing unit to write the image, and the analyzing unit controls the second drawing unit in accordance with a second drawing command, if the analyzed command is the second drawing command to instruct the second drawing unit to write the image.

7 Claims, 15 Drawing Sheets

FIG.6
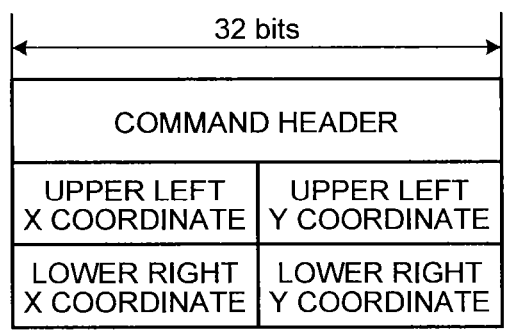
(a)
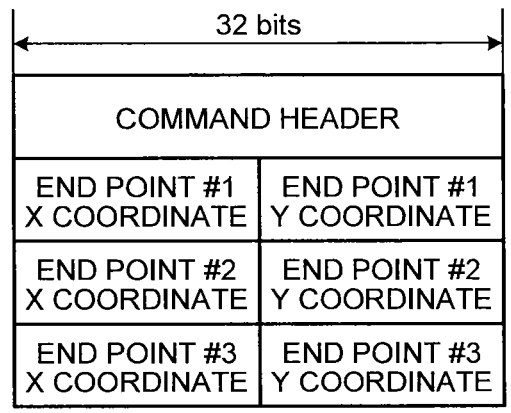
(b)

IMAGE PROCESSING DEVICE

CROSS-REFERENCE TO RELATED APPLICATIONS

The present application claims priority to and incorporates by reference the entire contents of Japanese Patent Application No. 2011-225237 filed in Japan on Oct. 12, 2011.

BACKGROUND OF THE INVENTION

1. Field of the Invention

The present invention relates to an image processing device suitable for an image forming apparatus.

2. Description of the Related Art

Conventionally, there are high resolution requirements and high processing speed requirements for the image forming apparatuses such as page printers. These requirements, however, are becoming difficult to be satisfied only by performances of CPUs (Central Processing Units) for controlling the image processing.

For example, when a page containing a picture image such as a natural image is printed in a color printer capable of printing a full-color image, a CPU performs a software-based image processing on image data which is a source of the picture image. The image processed image data is loaded into a band memory by the CPU. As the required printing resolution increases, the image processing for this picture image takes a longer time. For example, it becomes difficult to finish the image processing within a predetermined time range defined by the printing speed.

In contrast, recently, a part of the image processing conventionally performed by the CPU can be performed by hardware, owing to a progress of semiconductor technology. For example, Japanese Patent Application Laid-open No. 2003-208608 and Japanese Patent Application Laid-open No. 2004-282239 disclose technologies in which a drawing part for drawing a picture image is embodied in hardware, and a variable magnification processing, halftone processing and the like on the source image of the picture image are performed as pipeline processing for each horizontal line, so that the high speed processing is realized.

Japanese Patent Application Laid-open No. 2006-121437 discloses a technology in which a drawing part for drawing a graphic image such as a CG (Computer Graphics) image generated by software is embodied in hardware, so that the high speed processing is realized. Japanese Patent Application Laid-open No. 2005-309865 discloses a technology in which a drawing part is embodied in hardware, and a drawing command is generated in the CPU, so that the drawing and the drawing command generation is performed in parallel and the high speed processing is realized.

The drawing operation in the conventional technologies is roughly explained. FIG. 16 illustrates timings of an exemplary conventional drawing operation. Herein, for example, a drawing command analyzing unit which is a program run on a CPU reads out a picture image drawing variable magnification execution command for instructing to draw the picture image, and further reads out graphic image drawing execution commands #1 and #2 for instructing to draw the graphic images, from a main memory. The picture image drawing variable magnification execution command includes commands for instructing a gradation processing, a color conversion, and a variable magnification processing of the source image data.

At SEQ 500, a drawing command for the picture image is read out from the main memory, and analyzed by the drawing command analyzing unit. At SEQ 501, the analyzing result indicating that the drawing command is the picture image drawing variable magnification execution command is obtained. The drawing command analyzing unit sets a picture image drawing unit which may be configured by hardware for example, in accordance with the analyzed command. A picture image processing unit reads out a source image from the main memory in accordance with the setting at SEQ 502 and inputs it (SEQ 503). The picture image processing unit performs predetermined processing on the input source image, such as the color conversion processing, the zooming (variable magnification) processing, halftone processing and the like (SEQ 504). The image data obtained through the image processing on the source image data is written and drawn in the main memory by the picture image drawing unit which may be configured by hardware for example (SEQ 505, SEQ 506).

At SEQ 507, the graphic image drawing execution command #1 is read from the main memory, and analyzed by the drawing command analyzing unit. The analyzing result indicating that the drawing command is the graphic image drawing execution command is obtained at SEQ 508. The drawing command analyzing unit sets the graphic image drawing unit which may be configured by hardware for example, in accordance with the analyzed command. The graphic image drawing unit performs the graphic image drawing processing in accordance with the setting at SEQ 509, and draws the graphic image to the main memory at SEQ 510.

As for the next graphic image drawing execution command #2, similarly, the graphic image drawing execution command #2 is read out from the main memory by the drawing command analyzing unit at SEQ 511 and analyzed. The analyzing result indicating that the drawing command is the graphic image drawing execution command #2 is obtained at SEQ 512. The drawing command analyzing unit sets the graphic image drawing unit in accordance with the analyzed command. The graphic drawing unit performs the graphic image drawing processing in accordance with at SEQ 513, and draws the graphic image to the main memory at SEQ 514.

The graphic image drawing is performed by writing the image into the main memory while performing a rendering processing by the graphic image drawing unit. For example, in Japanese Patent Application Laid-open No. 2006-121437, as illustrated in SEQ 510 and SEQ 514, the image processing for which an access to the memory is a bottleneck is performed.

On the other hand, in the drawing processing of the picture image, a predetermined image processing is required for the source image data. For example, in the technology disclosed in Japanese Patent Application Laid-open No. 2003-208608, the image processing by the picture image processing unit is a bottleneck. In a term during when the image processing is performed, which is indicated as a time period from the end of SEQ 502 to the start of SEQ 506, there is no access to the main memory, and the access to the main memory is not efficient.

Particularly, in the system for drawing the image after subjected to the gradation processing on the memory, the picture image processing unit reads out the source image data before the image processing, and performs the color conversion processing, the variable magnification (zooming) processing, the gradation processing and the like on the read out image data, so that the image after subjected to the gradation processing and having a small bit depth is drawn on the memory. Thereby, although the access to the memory is not enough, an amount of the image processing is large. Therefore, the image processing inside of the picture image processing unit is likely to be a bottleneck.

SUMMARY OF THE INVENTION

It is an object of the present invention to at least partially solve the problems in the conventional technology.

An image processing device includes a storage unit capable of storing various kinds of images, a first drawing unit configured to write a source image in the storage unit, after the source image is subjected to an image processing by an image processing unit, a second drawing unit configured to generate an image and write the generated image in the storage unit, and an analyzing unit configured to analyze a page drawing command to obtain a command for any of the first drawing unit and the second drawing unit, so that the analyzing unit controls the first drawing unit in accordance with a first drawing command, if the analyzed command is the first drawing command to instruct the first drawing unit to write the image, and the analyzing unit controls the second drawing unit in accordance with a second drawing command, if the analyzed command is the second drawing command to instruct the second drawing unit to write the image. While one of the first drawing unit and the second drawing unit writes the image in a first drawing area of the storage unit, if the analyzing unit obtains the drawing command for the other of the first drawing unit and the second drawing unit, the analyzing unit judges whether the first drawing area overlaps a second drawing area of the storage unit in which the image is written by the other drawing unit in accordance with the drawing command for the other drawing unit, and if the analyzing unit judges that the first drawing area does not overlap the second drawing unit, the analyzing unit controls the other drawing unit to start a writing processing to write the image in the storage unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 6 is a schematic diagram illustrating examples of graphic image drawing commands;

DETAILED DESCRIPTION OF THE PREFERRED EMBODIMENTS

Figure 1:
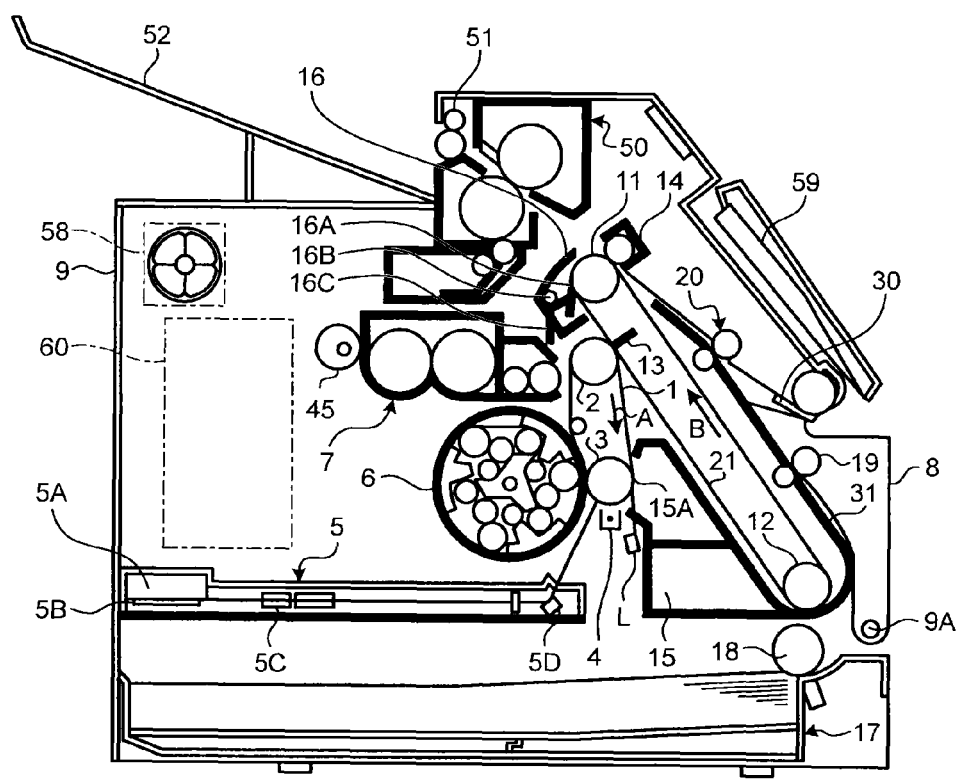
FIG. 1 is a schematic view illustrating an exemplary configuration of a mechanical section of an image forming apparatus to which an embodiment is applicable.

Hereinafter, embodiments of the image processing device will be described in detail, with reference to the accompanying drawings. FIG. 1 illustrates an exemplary configuration of a mechanical section of an image forming apparatus to which the present embodiment is applicable. In the image forming apparatus, a photosensitive belt 1, which is an image carrier, is rotatably supported by rotating rollers 2, 3 and rotated in an arrow A direction by each drive of the rotating rollers 2, 3. Around the periphery of the photosensitive belt 1, a charger 4 as a charging unit, a neutralizing lamp L, a cleaning blade 15A for the photosensitive belt 1 are equipped. At a downstream location of the charger 4, an optical writing part is disposed to which a laser beam is irradiated from a laser writing unit 5 as an optical writing unit.

At a downstream location of the optical writing unit, a multicolor developing unit 6 where a plurality of developing units is switchably supported. The multicolor developing unit 6 is provided with a yellow developing unit, a magenta developing unit, and a cyan developing unit for each color of toner to be contained. At an upper location of the multicolor developing unit 6, a black developing unit 7 containing black toner is disposed.

Any one of these developing units moves to a location where a developing is allowable, synchronized with a developing timing of the corresponding color. The multicolor developing unit 6 has a function to select any one of developing units by rotating by 120 degrees circumferentially. When these developing units move, the black developing unit 7 moves to a position apart from the photosensitive belt 1. This movement of the black developing unit 7 is done by the rotation of a cam 45.

The laser writing unit 5 generates laser beams sequentially from a laser light source, correspondingly to image forming signals (writing information) for multiple colors. The laser beams are deflected periodically by a polygon mirror 5B rotated by a polygon motor 5A. By the deflected beams through a fθ lens 5C and a mirror 5D, a charged surface of the photosensitive belt 1 is scanned to form an electrostatic latent image.

The latent image formed on the surface of the photosensitive belt 1 is developed with the toner from the corresponding developing unit, and a toner image is formed and retained. An intermediate transfer belt 21 is adjacent to the photosensitive belt 1, and supported rotatably in an arrow B direction by rotating rollers 11, 12. The toner image on the photosensitive belt 1 is transferred onto a surface of the intermediate transfer belt 21 by a transfer brush disposed at a rear side of the intermediate transfer belt 21.

The surface of the photosensitive belt 1 is cleaned by the cleaning blade 15A for each color to form a toner image of a predetermined color thereon. Every time when a toner image is formed on the surface of the photosensitive belt 1, the intermediate transfer belt rotates once so that the toner image of the photosensitive belt 1 is transferred onto the same position of the surface of the intermediate transfer belt 21. Thus, toner images for multiple colors are overlapped and then retained on the intermediate transfer belt 21. Then, the toner images are transferred onto a printing medium such as paper and plastic sheet.

When the toner images for multiple colors are transferred onto the printing medium, a sheet stored in a feeding unit (feeding cassette) 17 is rolled out by a feeding roller 18 and carried to a carrying roller 19. The sheet is once stopped when abutting on a pair of registration rollers 20. The sheet is carried again to a nip between the intermediate transfer belt 21 and a transfer roller 14 with timing when the transfer location of the toner images is adjusted properly.

The toner images for multiple colors on the intermediate transfer belt 21 are collectively transferred onto the sheet by an action of the transfer roller 14. Then, the sheet is carried to a fixing unit 50 where the toner images are fixed. Then, the sheet is ejected by a pair of ejecting rollers 51 to an ejection stacking unit 52 located at an upper part of a main frame 9.

Around the intermediate transfer belt 21, a cleaning unit 16 for the intermediate transfer belt 21 is disposed at a location of the rotating roller 11, so that a cleaning blade 16A can move apart from and closer to the intermediate transfer belt 21 via an arm 16 for moving the cleaning blade. This cleaning blade 16A is apart from the intermediate transfer belt 21 during a process of receiving toner images from the photosensitive belt 1, and approaches and contacts the intermediate belt 21 after the toner images are transferred onto the sheet from the intermediate transfer belt 21. Thus, the cleaning blade 16A scrapes off the remaining toner on the intermediate transfer belt 21 after the toner images are transferred onto the sheet therefrom.

As mentioned above, there are cleaning blades for the photosensitive belt 1 and the intermediate transfer belt 21. The exhausted toner scraped off by these blades is stored in a recycle container 15. The recycle container 15 is replaced as appropriate. The exhausted toner scraped off by the cleaning blade 16A is carried by an auger 16B disposed inside of the cleaning unit 16 for the intermediate transfer belt 21, so that the exhausted toner is carried to the recycle container 15.

A process cartridge 31 is a unit where the photosensitive belt 1, the charger 4, the intermediate transfer belt 21, the cleaning unit 16, a carrying guide 30 for defining a sheet carrying path are integrated. This unit can be replaced at the end of the life time. In addition to the replacement of the process cartridge 31, the multicolor developing unit 6 and the black developing unit 7 can be replaced at the end of their life times. For the purpose of the improved operability in replacement these units or removing the jammed paper, a front frame 8 which is a part of the main body is configured to rotate around a pivotal or support axis 9A so that the front frame can be opened and closed.

At a left hand side in FIG. 1, an electric and control unit 60 is placed. At an upper side thereof, a fan 58 is disposed to prevent overheating inside of the machine by air circulation or air venting. At a right hand side in FIG. 1, another relatively small feeing unit 59 is disposed. Incidentally, the intermediate transfer belt 21 is used as an intermediate transfer body in this embodiment. However, an intermediate transfer drum may be used as the intermediate transfer body.

Figure 2:
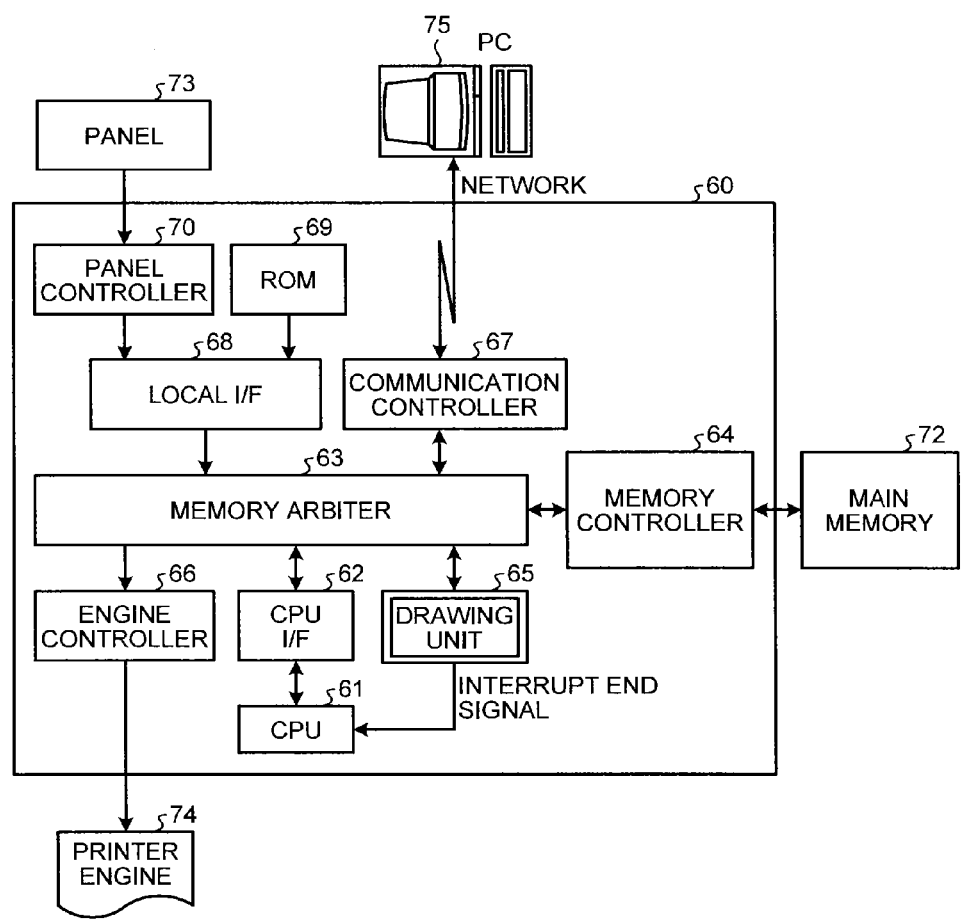
FIG. 2 is a block diagram illustrating an exemplary configuration of an electrical and control unit.

FIG. 2 illustrates an exemplary configuration of the electric and control unit 60. In the electric and control unit 60, a CPU (Central Processing Unit) 61 is connected via a CPU I/F 62 to a memory arbiter 63, and a ROM (Read Only Memory) 69 and a panel controller 70 are connected via a local I/F 68 to the memory arbiter 63. Furthermore, a main memory 72 is connected via a memory controller 64 to the memory arbiter 63. Furthermore, a drawing unit 65, an engine controller 66 and a communication controller 67 are connected to the memory arbiter 63. A printer engine 74 is connected to the engine controller 66.

The memory arbiter 63 arbitrates data transfers among these units connected to the arbiter 63. The CPU I/F 62 is an interface between the CPU 61 and the memory arbiter 63. The CPU 61 is connected to various units in the electric and control units via the CPU I/F 62 and the memory arbiter 63. The local I/F 68 is an interface between the ROM 69 and the memory arbiter 63, and between the panel controller and the memory arbiter 63. To the panel controller 70, a panel 73 provided with an operating element and a display unit allowing for the user operation is connected.

In the ROM 69, various programs and font information of character or the like are stored in advance (prestored). In accordance with the programs prestored in the ROM 69, the CPU 61 controls the operation of the electric and control unit 60 while using a RAM (Random Access Memory) as a work memory. It is possible to use the main memory 72 as the work memory. The CPU 61 also gives a command to the engine controller 66 for controlling the printer engine 74. The communication controller 67 controls a communication with an external device such as a personal computer (PC) 75 connected thereto via a network.

The memory controller 64, to which the main memory 72 is connected, controls an access to the main memory 72 which is done via the memory arbiter 63. The main memory 72 includes for example a PDL storage area, a drawing command storage area, a source image storage area, a band storage area, and a page code storage area. In the PDL storage area, a PDL (Page Description Language) transferred from the PC 75 for example is stored. In the drawing command storage area, the drawing command generated on the basis of the PDL is stored. In the source image storage area, a source image for the picture image is stored. In the band storage area, a band data generated on the basis of the PDL is stored. In the page code storage area, a coded band data is stored. The main memory 72 is further provided with an area where one or more programs to operate the CPU are stored.

The drawing unit 65 reads and analyzes an intermediate language generated on the basis of the PDL data by the CPU 61. In accordance with the analyzing result, the drawing unit 65 performs a drawing processing to write a band image into the band storage area of the main memory 72. For example, the band image written by the drawing unit 65 is read out from the maim memory 72 and supplied to the engine controller 66 via the memory controller 64 and the memory arbiter 64. The engine controller 66 controls the printer engine 74 in accordance with the supplied band image, so that the printing on the printing medium is performed.

Figure 3:
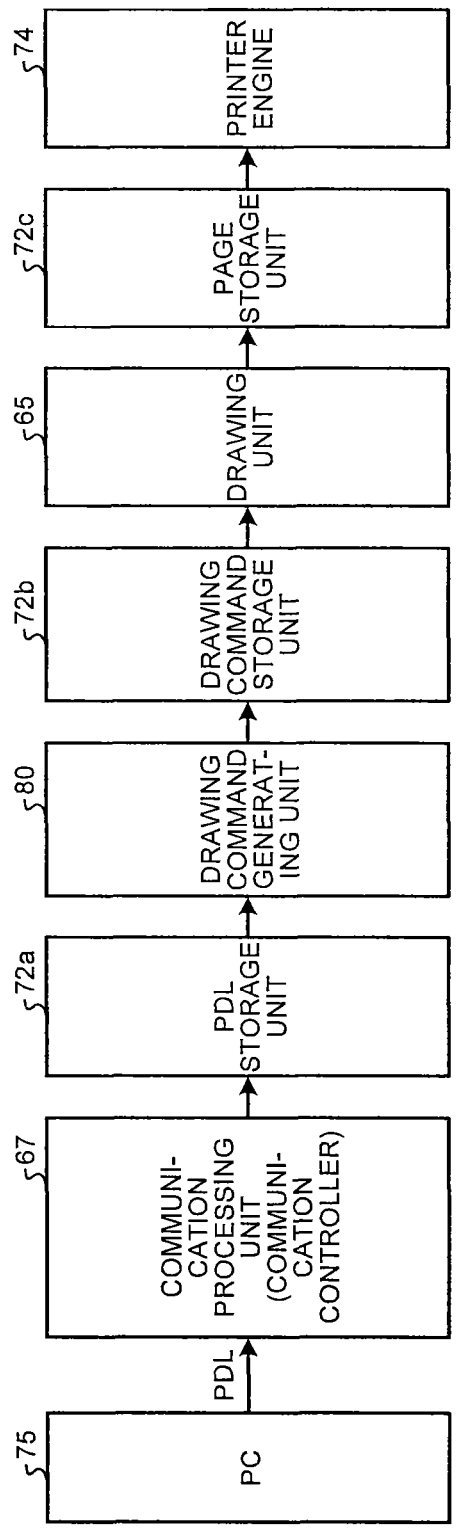
FIG. 3 is a schematic diagram illustrating a print process flow of the image forming apparatus to which the embodiment is applicable.

With reference to FIG. 3, a printing process flow of the image forming apparatus to which the present embodiment is applicable is explained schematically. For example, at the PC 75, PDL data including page-based print image data and drawing command is generated by means of application software. This PDL data is transmitted to the electric and control unit 60 of the image forming apparatus via a network for example. In the electric and control unit 60, the PDL data is received by the communication controller 67, and stored in the PDL storage unit 72a which is a predetermined area in the main memory 72.

The PDL data stored in the PDL storage unit 72a is read out by a drawing command generating unit 80 which is a program run on the CPU 61 for example. The drawing command generating unit 80 analyzes the read out PDL data to generate a drawing command. The drawing command is stored in a drawing command storage unit 72b which is a hardware drawing command area in the main memory 72.

In accordance with the drawing command for hardware drawing stored in the drawing command storage unit 72b, the drawing unit 65 performs the drawing by writing an image, band by band, into a page storage unit 72c which is the band memory storage area of the main memory 72. The drawing performed by the drawing unit 65 includes a first drawing processing for drawing a picture image which is an image obtained by subjecting the source image data to a predetermined image processing, and a second drawing processing for drawing a graphic image which is an image generated by a program or the like.

Incidentally, the drawing command for hardware drawing may be for example a drawing command adapted to the drawing unit 65 which is hardware independent of the CPU 61. Unless otherwise noted, hereinafter, the drawing command refers to a drawing command for hardware drawing.

Into the page storage unit 72c, one page of the drawn image data is stored. The drawn image data is read out from the page storage unit 72c and supplied to the printer engine, synchronized with the control of the printer engine. Thus, the printing on the printing medium is performed.

Figure 4:
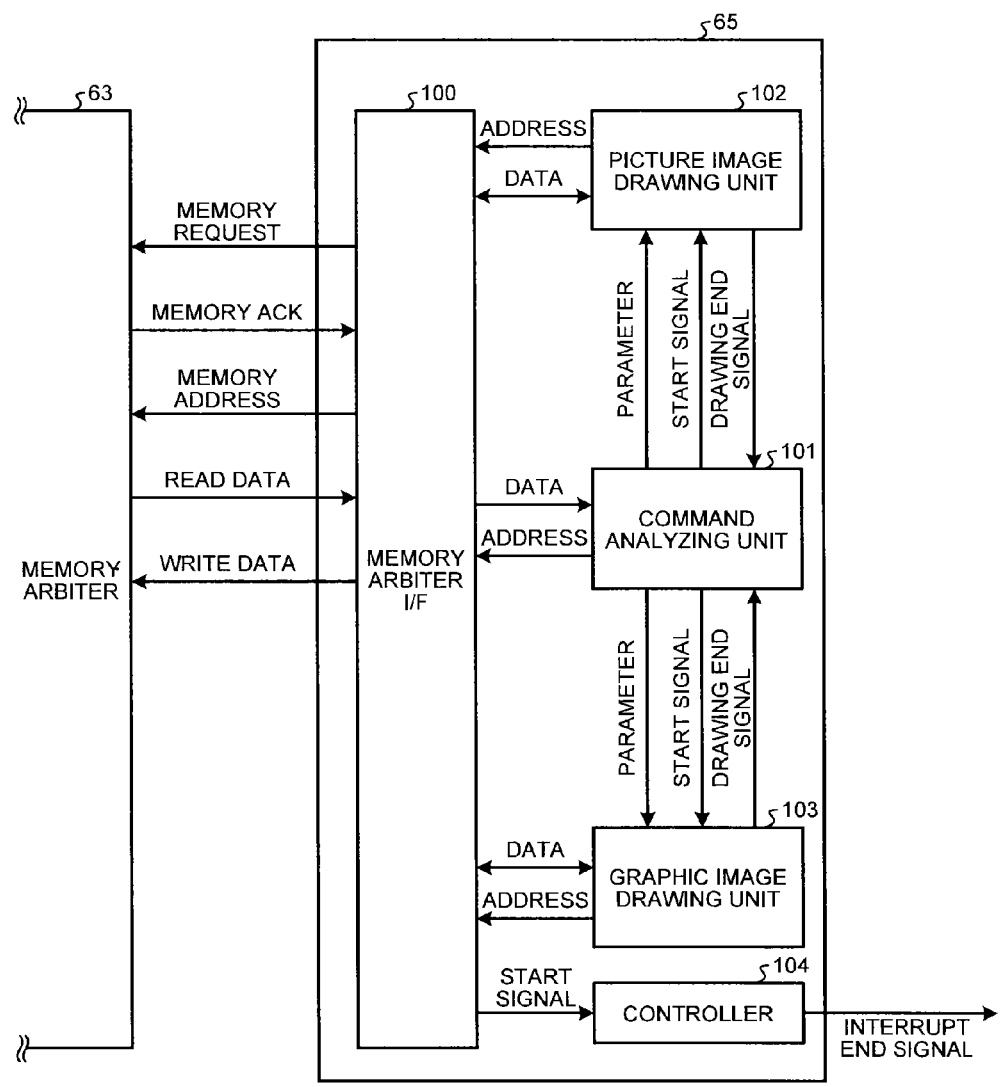
FIG. 4 is a block diagram illustrating an exemplary configuration of a drawing unit.

FIG. 4 illustrates an exemplary configuration of the drawing unit 65. The drawing unit 65 includes a memory arbiter I/F 100, a command analyzing unit 101, a picture image drawing unit 102, a graphic image drawing unit 103, and a controller 104. The controller 104 includes for example a microprocessor and a ROM, so that the microprocessor is operated in accordance with the program prestored in the ROM, for controlling the drawing unit 65 entirely.

The memory arbiter I/F 100 is an interface between the memory arbiter 63 and each of the command analyzing unit 101, the picture image drawing unit 102, and the graphic image drawing unit 103.

The command analyzing unit 101 reads out the drawing command from the hardware drawing command area in the drawing command storage area of the main memory 72, and analyzes the read out drawing command to obtain various commands. As a result of the analysis, if the drawing command is the drawing hardware parameter setting command, a parameter contained in the command is transferred to the picture image drawing unit 102 and the graphic image drawing unit 103. Then, the command analyzing unit 101 reads out the next drawing command from the main memory 72.

As a result of the analysis, if the drawing command is the picture image drawing command for drawing a picture image, the command analyzing unit 101 transfers a drawing parameter contained in the command to the picture image drawing unit 102, and then transfers a start signal for the picture image to the picture image drawing unit 102. Then, if the command analyzing unit 101 confirms an end signal which is sent from the picture image drawing unit 102 and indicates the completion of the picture image drawing, the command analyzing unit 101 reads out the next drawing command.

As a result of the analysis, if the drawing command is the graphic image drawing command for drawing the graphic image, the command analyzing unit 101 transfers a drawing parameter contained in the command to the graphic image drawing unit 103, and then transfers a start signal for the graphic image drawing to the graphic image drawing unit 103. Then, if the command analyzing unit 101 confirms an end signal which is sent from the graphic image drawing unit 103 and indicates the completion of the graphic image drawing, the command analyzing unit 101 reads out the next command.

The picture image drawing unit 102 receives and sets the drawing parameter for drawing the picture image transferred from the command analysis unit 101. The picture image drawing unit 102 starts the drawing processing for the picture image in accordance with the start signal transferred from the command analysis unit 101 after that. If the drawing for the picture image is completed, the picture image drawing unit 102 transmits the end signal indicating the completion of the drawing to the command analyzing unit 101.

The graphic image drawing unit 103 receives and sets the drawing parameter for drawing the graphic image, transferred from the command analyzing unit 101. The graphic image drawing unit 103 starts the drawing processing for the graphic image in accordance with the start signal transferred from the command analyzing unit 101 after that. If the drawing for the graphic image is completed, the graphic image analyzing unit 103 transmits the end signal indicating the completion of the drawing to the command analyzing unit 101.

Figure 5:
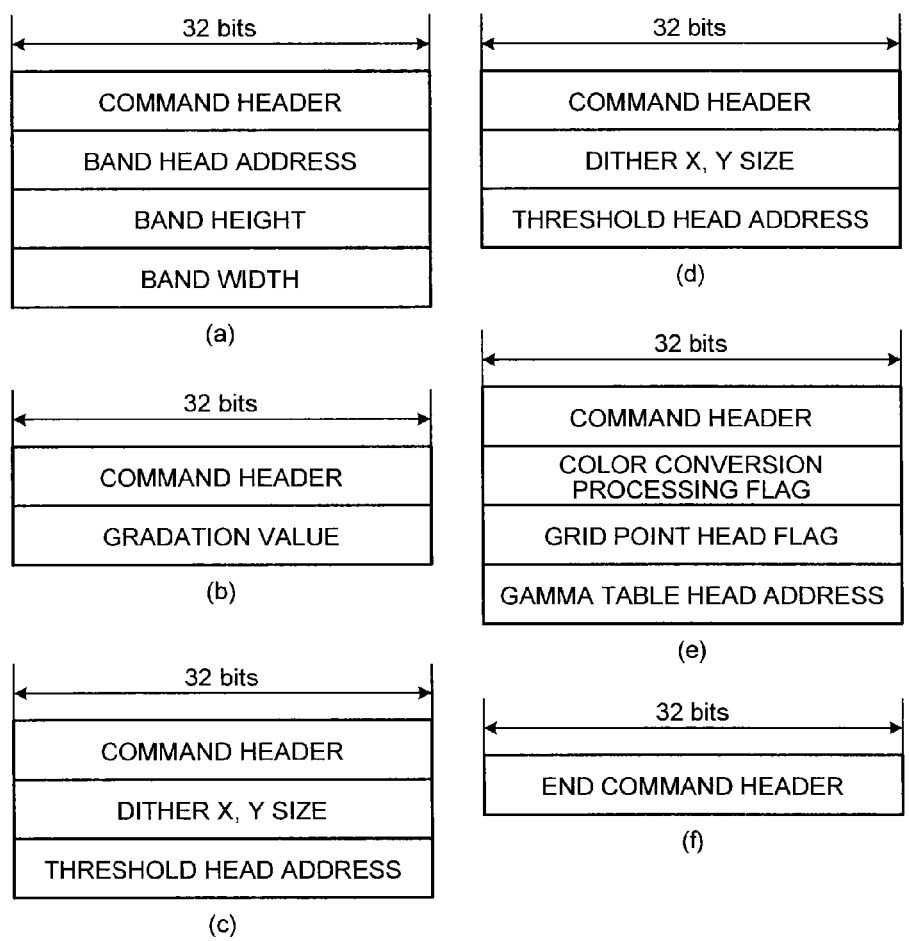
FIG. 5 is a schematic diagram illustrating examples of drawing hard parameter setting command.
Figure 7:
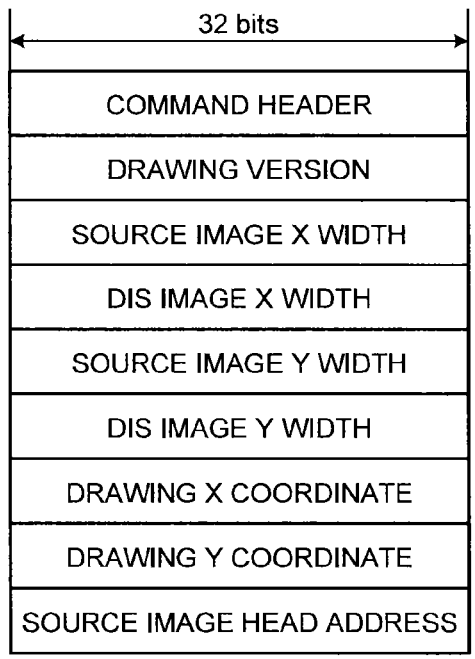
FIG. 7 is a schematic diagram illustrating an example of a picture image drawing command.

FIG. 5 to FIG. 7 illustrate examples of various command formats contained in the drawing commands. The drawing commands can be sorted into the drawing hardware parameter setting command for setting the hardware used for the drawing as illustrated in FIG. 5, the graphic image drawing command for drawing the graphic image as illustrated in FIG. 6, and the picture image drawing command for drawing the picture image as illustrated in FIG. 7. In these examples, each command is defined in a word unit having a data length of 32 bits.

FIG. 5 illustrates an exemplary drawing hardware parameter setting commands. An example (a) in FIG. 5 (FIG. 5(*a*)) indicates an example of a band initializing command. The band initializing command is a command for setting entire setting parameters which are parameters relating to the entire drawing processing. A band head address, a band height, and a band width are defined as parameters following to a header where a command name is indicated. When received this command, the command analyzing unit 101 stores these parameters in a band parameter storage unit 115 (see FIG. 9) in the picture image drawing unit 102, and in a band parameter storage unit 152 (see FIG. 10) in the graphic image drawing unit 103, respectively.

An examples (b) and (c) in FIG. 5 (FIG. 5(*b*) and FIG. 5(*c*)) indicate examples of the graphic image drawing setting commands for setting the graphic image drawing unit 103. FIG. 5(*b*) indicates a drawing gradation defining command for graphic image drawing. A drawing gradation value for drawing a graphic image is defined as a parameter, following to a header where a command name is indicated. When received this command, the command analyzing unit 101 stores the drawing gradation value in a drawing parameter storage unit 154 (see FIG. 10) in the graphic image drawing unit 103.

An example (c) in FIG. 5 (FIG. 5(*c*)) indicates a halftone parameter setting command for graphic image drawing. A dither size in (X, Y) (hereinafter, also called "dither X, Y size") relating to the graphic image and a halftone threshold head address are defined as parameters, following to a header where a command name is indicated. When received this command, the command analysis unit 101 sets the threshold head address to a DMA address setting unit 110 (see FIG. 9) and starts the DMA address setting unit 110. Thereby, the halftone threshold for graphic image drawing is read from sequentially from designated addresses in the drawing command storage area in the main memory 72, and stored in a threshold matrix storage unit 153 (see FIG. 10).

An example (d) in FIG. 5 (FIG. 5(*d*)) indicates a halftone parameter setting command for picture image drawing. A dither size in (X, Y) relating to the picture image and a halftone threshold head address are defined as parameters, following to a header where a command name is indicated. When received this command, the command analysis unit 101 sets the threshold head address to a DMA address setting unit 110 (see FIG. 9) and starts the DMA address setting unit 110. Thereby, the halftone threshold for picture image drawing is read from sequentially from designated addresses in the drawing command storage area in the main memory 72, and stored in a threshold matrix storage unit 117 (see FIG. 10). The dither size in (X,Y) is stored in a dither (X,Y) storage unit 116 (see FIG. 9).

An example (e) in FIG. 5 (FIG. 5(*e*)) indicates a color conversion parameter setting command for picture image drawing. A color conversion processing flag, a grid point head address, and a gamma table head address are defined as parameters, following to a header where a command name is indicated. An example (f) in FIG. 5 (FIG. 5(*f*)) indicates a band end command composed of only a header where a command name is indicated. This command indicates the completion of the defined band drawing. When received this command, the command analyzing unit 101 ends the processing of the band.

An example (a) in FIG. 6 (FIG. 6(*a*)) indicates a square drawing command for graphic image drawing to draw a square graphic image. Following to a header where a command name is indicated, X coordinate and Y coordinate of the upper left tip of the square, and X coordinate and Y coordinate of the lower right tip of the square are defined as parameters. When received this command, the command analyzing unit 101 stores the X and Y coordinates of the upper left tip and the X and Y coordinates of the lower right tip, and the command name in a drawing parameter storage unit 154 (see FIG. 10), and starts the graphic image drawing unit 103.

Figure 8:
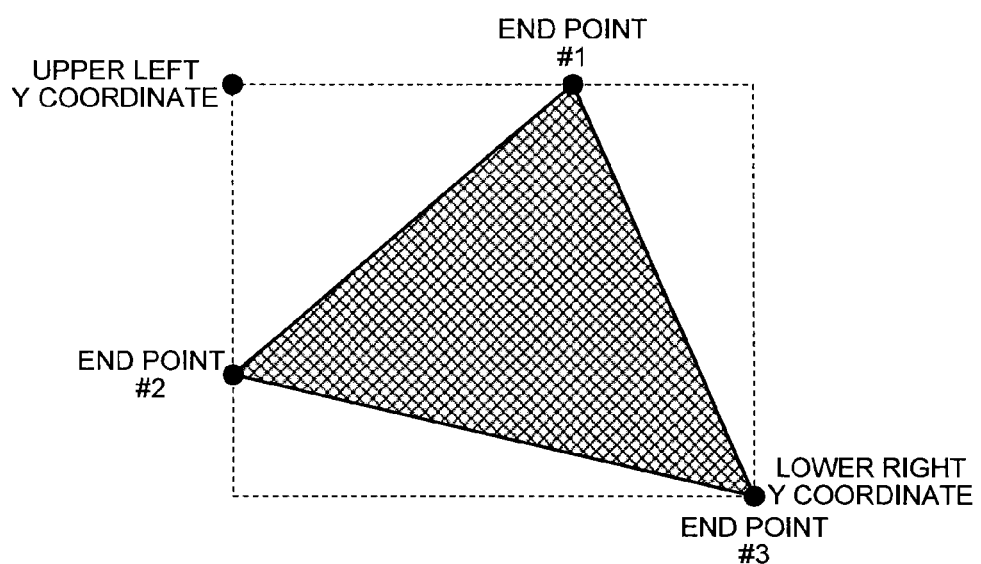
FIG. 8 is a schematic diagram illustrating a triangle drawing area.

An example (b) in FIG. 6 (FIG. 6(*b*)) indicates a triangle drawing command for graphic image drawing to draw a triangle graphic image. In the present embodiment, as illustrated in FIG. 8, a triangle drawing area is represented by coordinates of a square circumscribed around a triangle at its three end points (tips) #1, #2, and #3. Namely, as illustrated by an example (b) in FIG. 6 (FIG. 6(*b*)), in the triangle drawing command for graphic image drawing, X and Y coordinates of these end points #1, #2, and #3 are defined as parameters, following to a header where a command name is indicated. When received this command, the command analyzing unit 101 stores these X and Y coordinates of these tips of the triangle, and the command name in a drawing parameter storage unit 154 (see FIG. 10) included in the graphic image drawing unit 103, and starts the graphic image drawing unit 103.

FIG. 7 illustrates a variable magnification execution command for picture image drawing to draw a picture image. This command can define a variable magnification processing such as zooming in and zooming out with regard to a picture image (source image). In the variable magnification execution command for picture image drawing, a drawing version indicating a version to be drawn, X widths and Y widths of the source image and a DIS image after the variable magnification are defined, as well as X and Y coordinates for drawing the DIS image, as parameters, following to a header where a command name is indicated. Furthermore, in this command, a head address of the source image is defined as a parameter. When received this command, the command analyzing unit 101 stored each parameter in a variable magnification storage unit 118 (see FIG. 9) included in the picture image drawing unit 102, and starts the picture image drawing unit 102.

Figure 9:
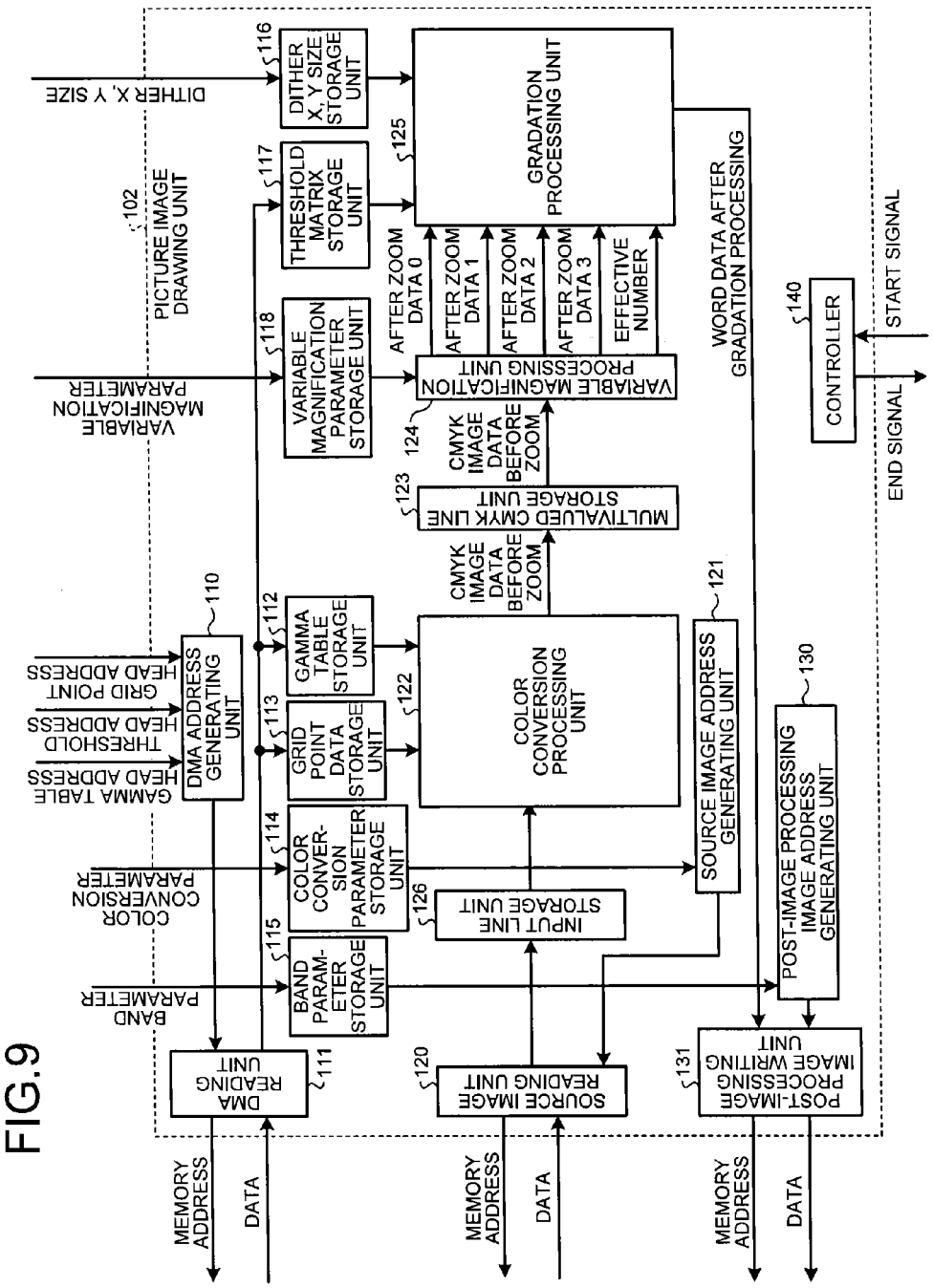
FIG. 9 is a block diagram illustrating an exemplary configuration of a picture image drawing unit.

FIG. 9 illustrates an exemplary configuration of the picture image drawing unit 102. In the picture image drawing unit 102, a DMA address generating unit 110 receives each head address of each DMA from the command analyzing unit 101 to generate DMA addresses and transfer the generated DMA addresses to a DMA reading unit 111. The DMA reading unit 111 receives each head address of each DMA from the DMA address generating unit 110. In accordance with the received head addresses of DMAs, the DMA reading unit 111 reads each data from the main memory 72 via the memory arbiter I/F 100. The DMA reading unit 111 stores the read each data into the gamma table storage unit 112, the grid point storage unit 113, and the threshold matrix storage unit 117, respectively.

The gamma table storage unit 112 stores therein the gamma table data for the picture image read from the main memory 72 by the DMA reading unit 111. The grid point storage unit 113 stores therein the grid point data for the picture image read from the main memory 72 by the DMA reading unit 111. The threshold matrix storage unit 117 stores therein the threshold matrix data read from the main memory 72 by the DMA reading unit 111.

The variable magnification storage unit 118 stores therein the variable magnification parameter for the picture image sent from the command analyzing unit 101. The color conversion parameter storage unit 114 stores therein the color conversion parameter for the picture image sent from the command analyzing unit 101. The band parameter storage unit 115 stores therein the band parameter sent from the command analyzing unit 101. The dither X, Y size storage unit 116 stores therein the dither size in (X, Y) for the picture image sent from the command analyzing unit 101.

A source image reading unit 120 reads the source image from the source image storage area of the main memory 72 via the memory arbiter I/F 100, and transfers the read source data to an input line storage unit 126. The input line storage unit 126 receives one line of the source image from the source image reading unit 120, and stores it. A source address generating unit 121 generates an address to read the source image from the source image storage area of the main memory 72.

A color conversion unit 122 receives the RGB image data from the input line storage unit 126, and performs the color conversion processing from RGB to CMY, and performs BG/UCR (Black Generation/Under Color Removal) processing. The generated multivalued CMYK data is transferred to a multivalued CMYK line storage unit 123. The multivalued CMYK line storage unit 123 stores the multivalued CMYK data corresponding to a horizontal line generated by the color conversion unit 122. By storing the line-based image data, there is no need to calculate again the same line when zooming the image in the vertical direction.

A variable magnification processing unit 124 reads the multivalued CMYK data sequentially from the multivalued CMYK line storage unit 123, and performs the variable magnification processing (e.g. zooming in processing) with designated variable magnifications in horizontal/vertical directions. The variable magnification processing unit 124 transfers the multivalued CMYK data after subjected to the variable magnification processing to a gradation processing unit 125. The gradation processing unit 125 is a unit to perform a gradation processing including a halftone processing.

The gradation processing unit 125 reads a threshold matrix from the threshold matrix storage unit 117. Then, on the basis of the threshold matrix, the gradation processing unit 125 performs the gradation processing on the multivalued CMYK data after subjected to the variable magnification processing received from the variable magnification processing unit 124. For example, the gradation processing unit 125 performs the gradation processing to limit the gradation of the multivalued CMYK data. In this case, a data amount of the multivalued CMYK data after the gradation processing becomes smaller than a data amount before the gradation processing. The gradation processing unit 125 transfers the multivalued CMYK data after subjected to the gradation processing to a post-image processing image writing unit 131 by a unit of word in the main memory 72.

The post-image processing image writing unit 131 writes the multivalued CMYK data transferred from the gradation unit 125 in the picture image storage area in the band storage area of the main memory 72 via the memory arbiter I/F 100. A post-image processing image address generating unit 130 performs an address calculation of the picture image area in the band storage area of the main memory 72.

A controller 140, which has a microprocessor and a ROM for example, controls the picture image drawing unit 102 in accordance with the program prestored in the ROM. For example, the controller 140 starts the processing by the picture image drawing unit 102 on the basis of the start signal transmitted from the command analyzing unit 101. The controller 140 transmits the drawing end signal to the command analyzing unit 101 at the completion of the drawing.

Figure 10:
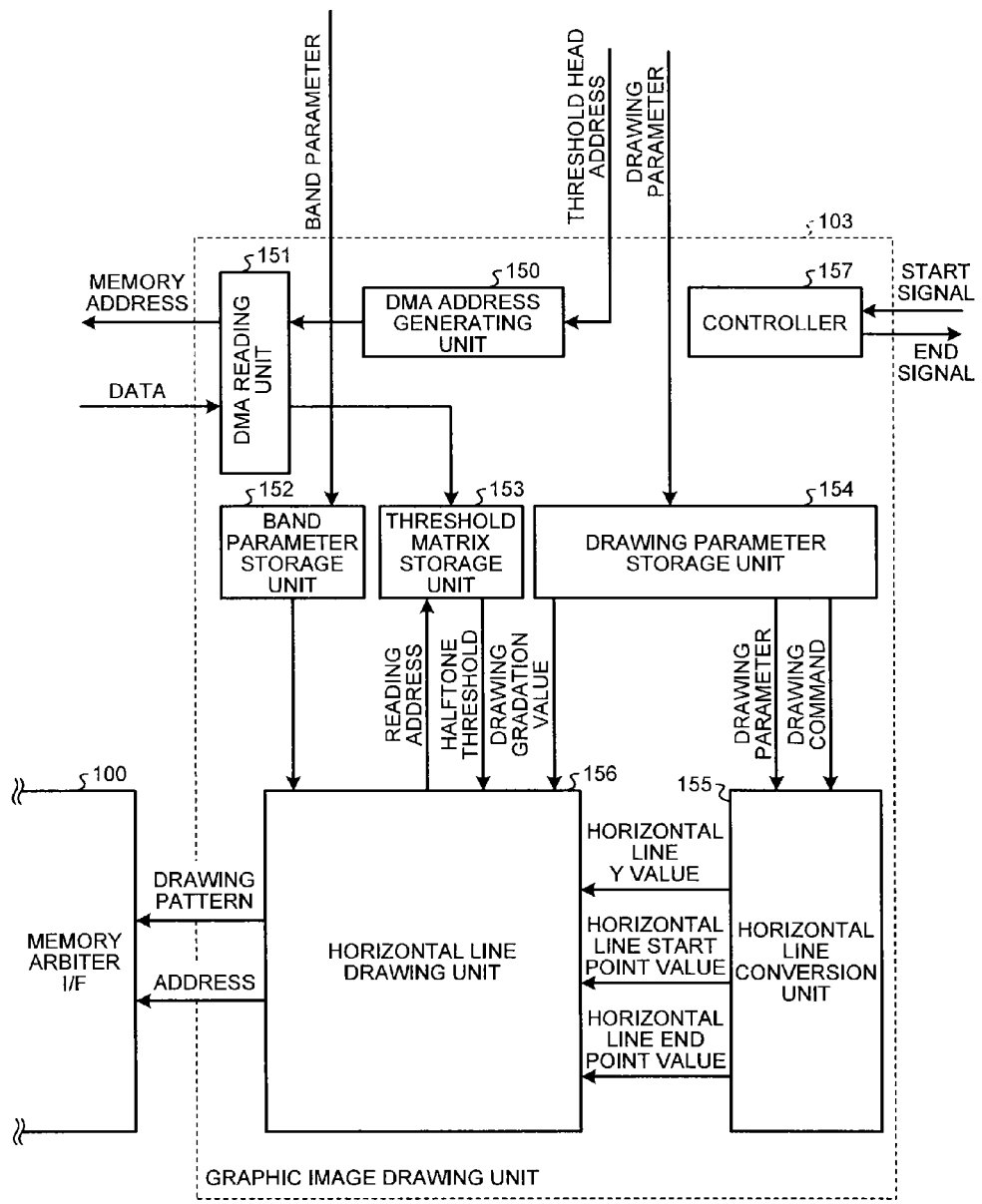
FIG. 10 is a block diagram illustrating an exemplary configuration of a graphic image drawing unit.

FIG. 10 illustrates an exemplary configuration of the graphic image drawing unit 103. A DMA address generating unit 150 receives each head address of each DMA and generates each DMA address, and transfers them to a DMA reading unit 151. The DMA reading unit 151 receives each head address of each DMA from the DMA address generating unit 150. In accordance with the received head addresses of DMAs, the DMA reading unit 151 reads the threshold matrix for the graphic image from the main memory 72 via the memory arbiter I/F 100. The read data is stored in a threshold matrix storage unit 153.

A drawing parameter storage unit 154 stores the drawing parameter for graphic image drawing sent from the command analyzing unit 101. A band parameter storage unit 152 stores the band parameter sent from the command analyzing unit 101.

A horizontal line conversion unit 155 reads the drawing parameter for graphic image drawing from the drawing parameter storage unit 154. The read parameter is converted into horizontal data including a horizontal line Y value, a horizontal line start value, and a horizontal line end value, and transferred to a horizontal line drawing unit 156. On the basis of the horizontal data transferred from the horizontal line conversion unit 155, the horizontal line drawing unit 156 performs the drawing processing of the horizontal line on the band storage area in the main memory 72 via the memory arbiter I/F 100.

A controller 157, which has a microprocessor and a ROM for example, controls the graphic image drawing unit 103 in accordance with the program prestored in the ROM. For example, the controller 157 starts the processing by the graphic image drawing unit 103 on the basis of the start signal transmitted from the command analyzing unit 101. The controller 157 transmits the drawing end signal to the command analyzing unit 101 at the end of the drawing.

Figure 11:
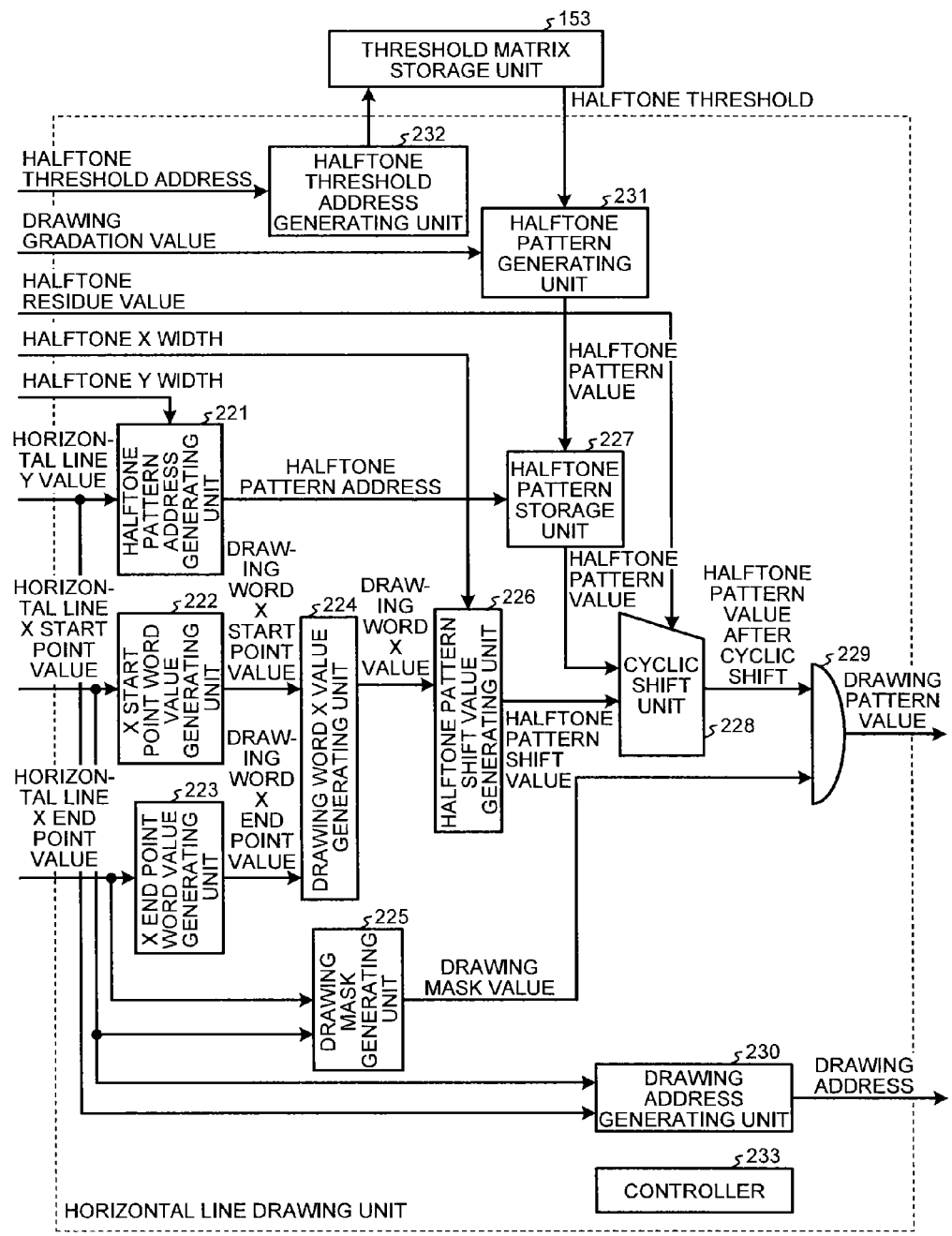
FIG. 11 is a block diagram illustrating an exemplary configuration of a horizontal line drawing unit.

FIG. 11 illustrates an exemplary configuration of the horizontal line drawing unit 156. A halftone pattern address generating unit 221 performs MOD operation (horizontal line Y value MOD halftone pattern Y width) for obtaining a halftone pattern Y value which is a residue by dividing the horizontal Y value by the halftone pattern Y width. The halftone pattern address generating unit 221 transfers this halftone pattern Y value as a halftone pattern address to a halftone pattern storage unit 227.

The halftone pattern storage unit 227 stores the halftone pattern value corresponding to the halftone pattern Y width of a horizontal line of drawing word. In accordance with the halftone pattern address transferred from the halftone pattern address generating unit 221, the accessed halftone pattern value is transferred to a cyclic shift unit 228.

An X start point word value generating unit 222 obtains a drawing word X start point value in a unit of drawing word from a horizontal line X start point value transferred from the horizontal line conversion unit 155. The obtained drawing word X start point value is transferred to a drawing word X value generating unit 224. An X end point word value generating unit 223 obtains a drawing word X end point value in a unit of drawing word from a horizontal line X end point value transferred from the horizontal line conversion unit 155. The obtained drawing word X end point value is transferred to the drawing word X value generating unit 224.

The drawing word X value generating unit 224 generates a drawing word X value from the X start point value to the X end point value in a unit of drawing word, respectively transferred from the X start point word value generating unit 222 and the X end point word value generating unit 223. The generated drawing word X value is transferred to a halftone pattern shift value generating unit 226.

The halftone pattern shift value generating unit 226 performs MOD operation (drawing word X value MOD halftone pattern X width) for obtaining a halftone pattern X value which is a residue by dividing the drawing word X value by the halftone pattern X width. This halftone pattern X value is transferred as a halftone pattern shift value to the cyclic shift unit 228.

The cyclic shift unit 228 receives the halftone pattern value, the halftone pattern shift value, and the halftone pattern residue value from the halftone pattern storage unit 227, the halftone pattern shift value generating unit 226, and the drawing parameter storage unit 154, respectively. The cyclic shift unit 228 shifts cyclically the halftone pattern value, and inputs the halftone pattern value after the cyclic shift to a first input terminal of a logic operation unit 229.

A drawing mask generating unit 225 generates a drawing mask from the X start point to the X end point for each drawing word from the horizontal line X start point value and the horizontal line X end point value. A value of the drawing mask is input to a second input terminal of the logic operation unit 229.

The logic operation unit 229 performs a logical AND operation with regard to the inputs from the first input terminal and the second input terminal. Namely, the logic operation unit 229 performs the logical AND operation with regard to the halftone pattern value after the cyclic shift input from the cyclic shift unit 228 and the drawing mask value input from the drawing mask generating unit 225, so that the drawing pattern value is generated. This drawing pattern value is transferred to the memory arbiter I/F 100.

From the horizontal line Y value and the horizontal line X start point value, a drawing address generating unit 230 generates a drawing address which is an address to perform the drawing in the band storage area in the main memory 72. The generated drawing address is transferred to the memory arbiter I/F 100.

A halftone pattern generating unit 231 is started after receiving the graphic image drawing gradation value definition command, which is described later. The halftone pattern generating unit 231 reads a threshold from the designated halftone threshold address in the threshold matrix storage unit 153. Then, in accordance with the read threshold and the drawing gradation value received from the drawing parameter storage unit 154, the halftone pattern generating unit 231 performs the gradation processing, and stores the generated halftone pattern value in the halftone storage unit 227.

A halftone threshold address generating unit 232 is started after receiving the graphic image drawing graduation value definition command, which is described later. The halftone threshold address generating unit 232 generates addresses sequentially from the designated halftone threshold addresses in the threshold matrix storage unit 153.

A controller 233, which has a microprocessor and a ROM for example, controls the entire operation of the horizontal line drawing unit 156 in accordance with the program pre-stored in the ROM.

Figure 12:
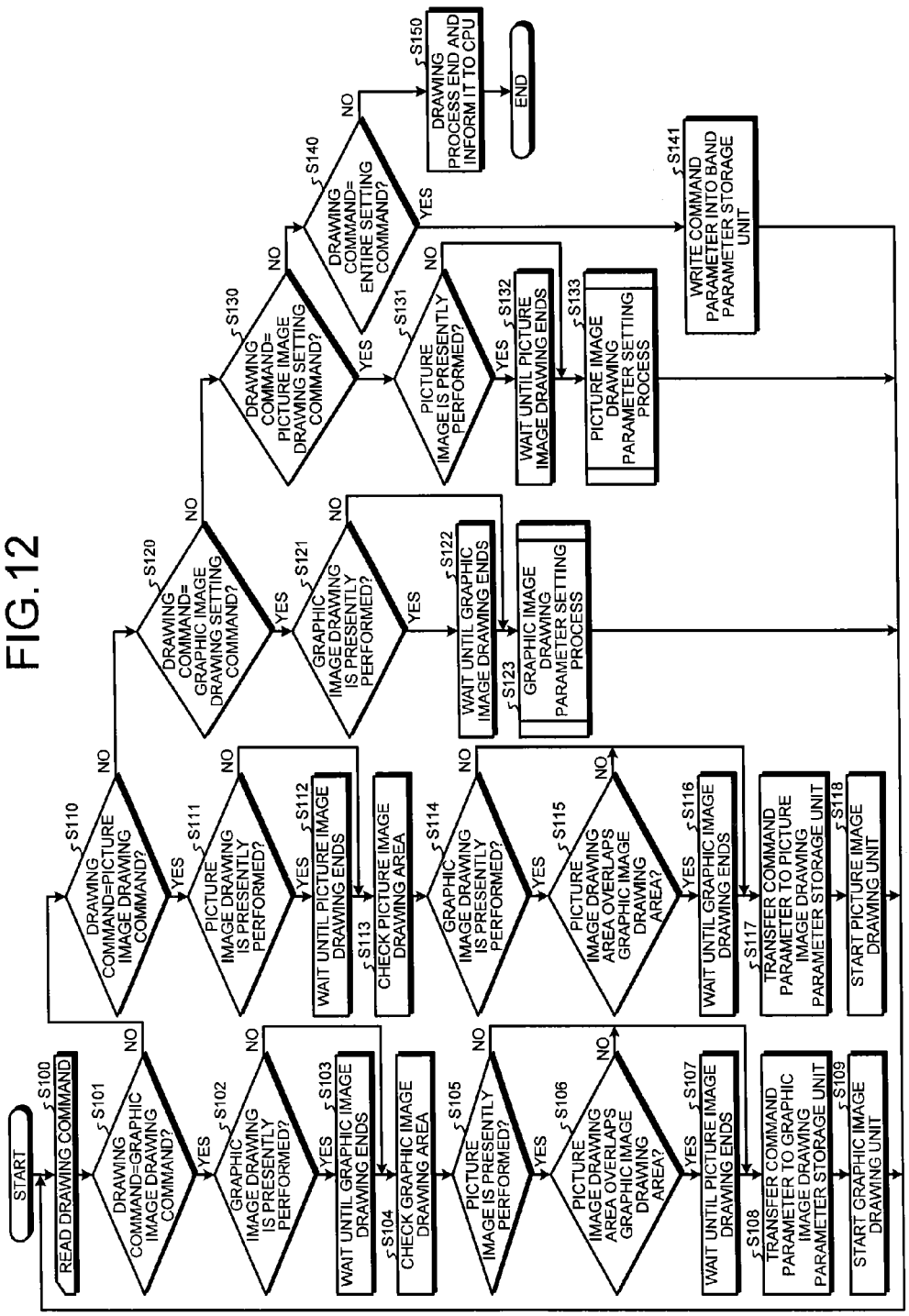
FIG. 12 is a flow chart illustrating an exemplary processing by a command analyzing unit according to an embodiment.

FIG. 12 is a flow chart illustrating an exemplary operation of the command analyzing unit 101 according to the present embodiment. The command analyzing unit 101 analyzes the drawing command. The command analyzing unit 101 also has a function as a control unit to control the start-up of the picture image drawing unit 102 and the graphic image drawing unit 103, in accordance with the analysis result of the drawing command.

The command analyzing unit 101 reads the drawing command from the drawing command storage area of the main memory 72 at step S100. Then, at the next steps S101, S110, S120, S130, and S140, the command analyzing unit 101 judges a kind of the read drawing command.

If the command analyzing unit 101 reads the drawing command at step S100, the process goes to step S101. At this step, it is judged whether the read drawing command is the graphic image drawing command to instruct the graphic image drawing. If it is judged that the drawing command is the graphic image drawing command, the process goes to step S102. At this step, it is judged whether the graphic image drawing is presently performed by the graphic image drawing unit 103. If it is judged that the graphic image drawing is not presently performed, the process goes to step S104, which is described later.

If the command analyzing unit 101 judges that the graphic image drawing is presently performed by the graphic image drawing unit 103 at step S102, the process goes to step S103. At this stage, the command analyzing unit 101 stands by until the graphic image drawing unit 103 completes the present graphic image drawing. This is because the graphic image 103 cannot be rebooted while performing the drawing. When the end signal indicating the completion of the drawing is transferred from the graphic image drawing unit 103, the command analyzing unit 101 judges that the drawing by the graphic image drawing unit 103 is completed, and the process goes to S104.

At step S104, the command analyzing unit 101 checks the drawing area of the graphic image, on the basis of the drawing command read at step S100. If the read drawing command is a drawing command to draw a square graphic image as illustrated in FIG. 6(a), an area defined by the X and Y coordinates of the upper left tip and the X and Y coordinates of the lower right tip is determined as the drawing area. On the other hand, if the drawing command is a drawing command to draw a triangle graphic image as illustrated in FIG. 6(b), a square area which is circumscribed around a triangle at its three end points (tips) #1, #2, and #3 and defined by X and Y coordinates of each of #1, #2, and #3 is determined as the drawing area.

The process goes to step S105 where the command analyzing unit 101 judges whether the picture image drawing unit 102 performs a picture image drawing. If the command analyzing unit 101 judges that the picture image drawing unit is not performing the picture image drawing, the process goes to step S108, which is described later.

On the other hand, if the command analyzing unit 101 judges that the picture image drawing unit 102 presently performs the picture image drawing at step S105, the process goes to step S106. At step S106, the command analyzing unit 101 compares the drawing area of the picture image presently drawn by the picture image drawing unit 102 with the drawing area of the graphic image determined at step S104, and judges whether the drawing area of the picture image overlaps the drawing area of the graphic image.

Incidentally, the drawing area of the picture image may be for example determined by the DIS image X width and the DIS image Y width, as well as the drawing X coordinate and the drawing Y coordinate, which are included in the drawing command of the picture image read when drawing the picture image (FIG. 7).

At step S106, if the command analyzing unit 101 judges that the drawing area of the picture image does not overlap the drawing area of the graphic image, the process goes to step S108, which is described later.

On the other hand, at step S106, if the command analyzing unit 101 judges that the drawing area of the picture image overlaps the drawing area of the graphic image, the process goes to step S107. At this step, in order to keep the drawing order, the command analyzing unit 101 stands by until the picture image drawing unit 102 completes the present picture image drawing. When the end signal indicating the completion of the drawing is transferred from the picture image drawing unit 102, the command analyzing unit 101 determines that the picture image drawing unit 102 completes the drawing, and the process goes to step S108.

At step S108, the command analyzing unit 101 transfers the drawing command parameters to the drawing parameter storage unit 154 of the graphic image drawing unit 103. Then, the process goes to step S109 where the command analyzing unit 101 transmits a start signal to the graphic image unit 103 to start the graphic unit 103. Upon or after starting the graphic image drawing unit 103, the process returns to step S100 for reading the next drawing command.

At step S101, if the command analyzing unit 101 judges that the read drawing command is not the graphic image drawing command, the process goes to step S110. At step S110, the command analyzing unit 101 judges whether the drawing command is a picture image drawing command to instruct the picture image drawing. If the drawing command is judged as the picture image drawing command, the process goes to step S111 where it is judged whether the picture image drawing unit 102 presently performs the picture image drawing. If it is judged that the picture image drawing is not performed, the process goes to step S113, which is described later.

On the other hand, if the command analyzing unit 101 judges that the picture image drawing unit 102 presently performs the picture image drawing at step S111, the process goes to step S112. At this step, the command analyzing unit 101 stands by until the picture image drawing unit 101 completes the present picture image drawing. This is because the picture image drawing unit 102 cannot be rebooted while performing the drawing. When the end signal indicating the completion of the drawing is transferred from the picture image drawing unit 102, the command analyzing unit determines that the picture image drawing unit 102 completes the drawing, and the process goes to step S113.

At step S113, on the basis of the drawing command read at step S100, the command analyzing unit 101 checks the drawing area of the picture image. The drawing area of the picture image can be determined for example by the DIS image X width and the DIS image Y width, as well as the drawing X coordinate and the drawing Y coordinate, which are included in the drawing command of the picture image read when drawing the picture image (FIG. 7).

The process goes to step S114, the command analyzing unit 101 judges whether the graphic image drawing unit 103 performs the graphic image drawing. If it is judged that the drawing is not performed, the process goes to step S117, which is described later.

On the other hand, if the command analyzing unit 101 judges that the graphic image drawing unit 103 presently performs the graphic image drawing at step S114, the process goes to step S115. At step S115, the command analyzing unit 101 compares the drawing area of the graphic image presently drawn by the graphic image drawing unit 103 with the drawing area of the picture image determined at step S113, and judges whether the drawing area of the graphic image overlap the drawing area of the picture image.

Incidentally, the drawing area of the graphic image is determined on the basis of the drawing command of the graphic image drawing read when drawing the graphic image (see FIG. 6(a) and FIG. 6(b)). Namely, if the read drawing command is a drawing command to draw a square graphic image as illustrated in FIG. 6(a), an area defined by the X and Y coordinates of the upper left tip and the X and Y coordinates of the lower right tip is determined as the drawing area. On the other hand, if the drawing command is a drawing command to draw a triangle graphic image as illustrated in FIG. 6(b), a square area which is circumscribed around a triangle at its three end points (tips) #1, #2, and #3 and defined by X and Y coordinates of each of #1, #2, and #3 is determined as the drawing area.

At step S115, if the command analyzing unit 101 judges that the drawing area of the graphic image does not overlap the drawing area of the picture image, the process goes to step S117, which is described later.

On the other hand, at step S115, if the command analyzing unit 101 judges that the drawing area of the graphic image overlaps the drawing area of the picture image, the process goes to step S116. At this step, in order to keep the drawing order, the command analyzing unit 101 stands by until the graphic image drawing unit 103 completes the present graphic image drawing. When the end signal indicating the completion of the drawing is transferred from the graphic image drawing unit 103, the command analyzing unit 101 determines that the graphic image drawing unit 103 completes the drawing, and the process goes to step S117.

At step S117, the command analyzing unit 101 transfers the drawing command parameters to the variable magnification parameter storage unit 118 of the picture image drawing unit 102. Then, the process goes to step S118 where the command analyzing unit 101 transmits a start signal to the picture image unit 102 to start the picture unit 102. Upon or after starting the picture image drawing unit 102, the process returns to step S100 for reading the next drawing command.

At step S110, if the command analyzing unit judges that the read drawing command is not the picture image drawing command, the process goes to step S120 where the command analyzing unit judges whether the drawing command is a graphic image drawing setting command. If the command analyzing unit 101 judges that the command is the graphic image drawing setting command, the process goes to step S121 where the command analyzing unit 101 judges whether the graphic image drawing unit 103 is presently performing the graphic image drawing. If the command analyzing unit 101 judges that the graphic image drawing unit is not performing the drawing, the process goes to step S123, which is described later.

On the other hand, if the command analyzing unit 101 judges that the graphic image drawing unit 103 is presently performing the graphic image drawing at step S121, the process goes to step S122 since the parameter setting cannot be performed for the graphic image drawing unit 103. At step S122, the command analyzing unit 101 stands by until the graphic image drawing unit 103 completes the graphic image drawing. When an end signal indicating the completion of the drawing is transferred from the graphic image drawing unit 103, the command analyzing unit 101 determines that the graphic image drawing unit 103 completes the drawing, and the process goes to step S123.

At step S123, the command analyzing unit 101 sets the graphic image drawing parameters with regard to the graphic image drawing unit 103. The detail of the graphic image drawing parameter setting process at the step S123 is described later. Upon or after completing the graphic image drawing parameter setting process at step S123, the process returns to step S100 for reading the next drawing command.

At step S120, if the command analyzing unit 101 judges that the read drawing command is not the graphic image drawing setting command, the process goes to step S130 where the command analyzing unit 101 judges whether the drawing command is a picture image drawing setting command. If it is judged that the drawing command is the picture image drawing setting command, the process goes to step S131 where the command analyzing unit 101 judges whether the picture image drawing unit 102 is presently performing the picture image drawing. If it is judged that the picture image drawing is not presently performed, the process goes to step S133.

On the other hand, if the command analyzing unit 101 judges that the picture image drawing is presently performed at step S131, the process goes to step S132 since the parameter setting cannot be performed for the picture image drawing unit 102. At step S132, the command analyzing unit 101 stands by until the picture image drawing unit 102 completes the present picture image drawing. When an end signal indicating the completion of the drawing is transferred from the picture image drawing unit 102, the command analyzing unit 101 determines that the picture image drawing unit 102 completes the drawing, and the process goes to step S133.

At step S133, the command analyzing unit 101 sets the picture image drawing setting parameters with regard to the picture image drawing unit 102. The detail of the picture image drawing parameter setting process at the step S133 is described later. Upon or after completing the picture image drawing parameter setting process at the step S133, the process returns to step S100 for reading the next drawing command.

At step S130, if the command analyzing unit 101 judges that the read drawing command is not the picture image drawing setting command, the process goes to step S140 where the command analyzing unit 101 judges whether the drawing command is an entire setting command. If the command analyzing unit 101 judges that the command is the entire setting command, the process goes to step S141. At step S141, the command analyzing unit 101 writes the band head address, the band height and the band width defined in the band initialization command as illustrated in FIG. 5(a) into the band parameter storage unit 115 of the picture image drawing unit 102 and into the band parameter storage unit 152 of the graphic image drawing unit 103, respectively. Then, the process returns to step S100 for reading the next drawing command.

At step S140, if the command analyzing unit 101 judges that the read drawing command it not the entire setting command, the command analyzing unit 101 determines that the drawing command is a band end command. In this case, the command analyzing unit 101 proceeds the process to step S150 for terminating the band drawing processing and informing this to the CPU 61. The completion of the band drawing processing is informed by sending an interrupt end signal from the controller 104 of the drawing unit 65 to the CPU 61, for example.

Figure 13:
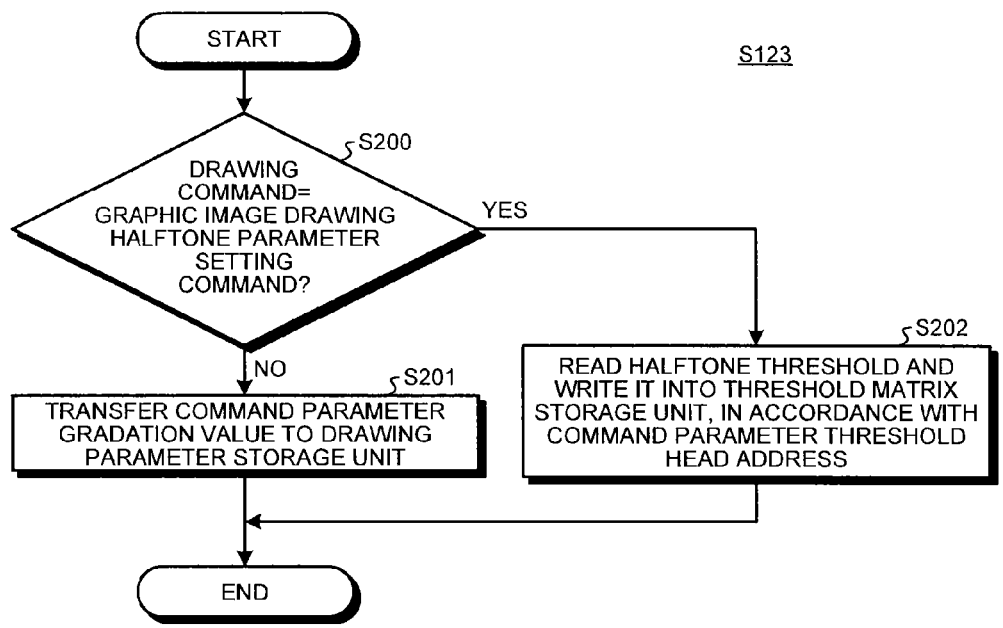
FIG. 13 is a flow chart illustrating an example of a graphic image drawing parameter setting process.

FIG. 13 is a flow chart illustrating an example of the setting process of the graphic image drawing parameter at the step S123. At step S200, the command analyzing unit 101 judges whether the drawing command read at the step S100 is the halftone parameter setting command for graphic image drawing as illustrated in FIG. 5(c).

If it is judged that the drawing command is not the halftone parameter setting command for graphic image drawing, it can be determined that the drawing command is the drawing gradation definition command for graphic image drawing. Thereby, the command analyzing unit 101 proceeds the process to step S201 to transfer the gradation value defined by the command to the drawing parameter storage unit 154 of the graphic image drawing unit 103.

On the other hand, at step S200, the command analyzing unit 101 judges that the drawing command read at step S100 is the halftone parameter setting command for graphic image drawing, the process goes to step S202. At step S202, the command analyzing unit 101 writes the threshold head address defined by the command into the DMA address generating unit 150 of the graphic image drawing unit 103, and stars the DMA reading unit 151. The DMA reading unit 151 reads the halftone thresholds for graphic image drawing sequentially from the drawing command storage area of the main memory 72, and writes them into the threshold matrix storage unit 153 of the graphic image drawing unit 103.

If the processing from step S201 to step S202 is completed, the command analyzing unit 101 ends a series of processing illustrated by the flow chart in FIG. 13 and returns the process to the flow chart in FIG. 12.

Figure 14:
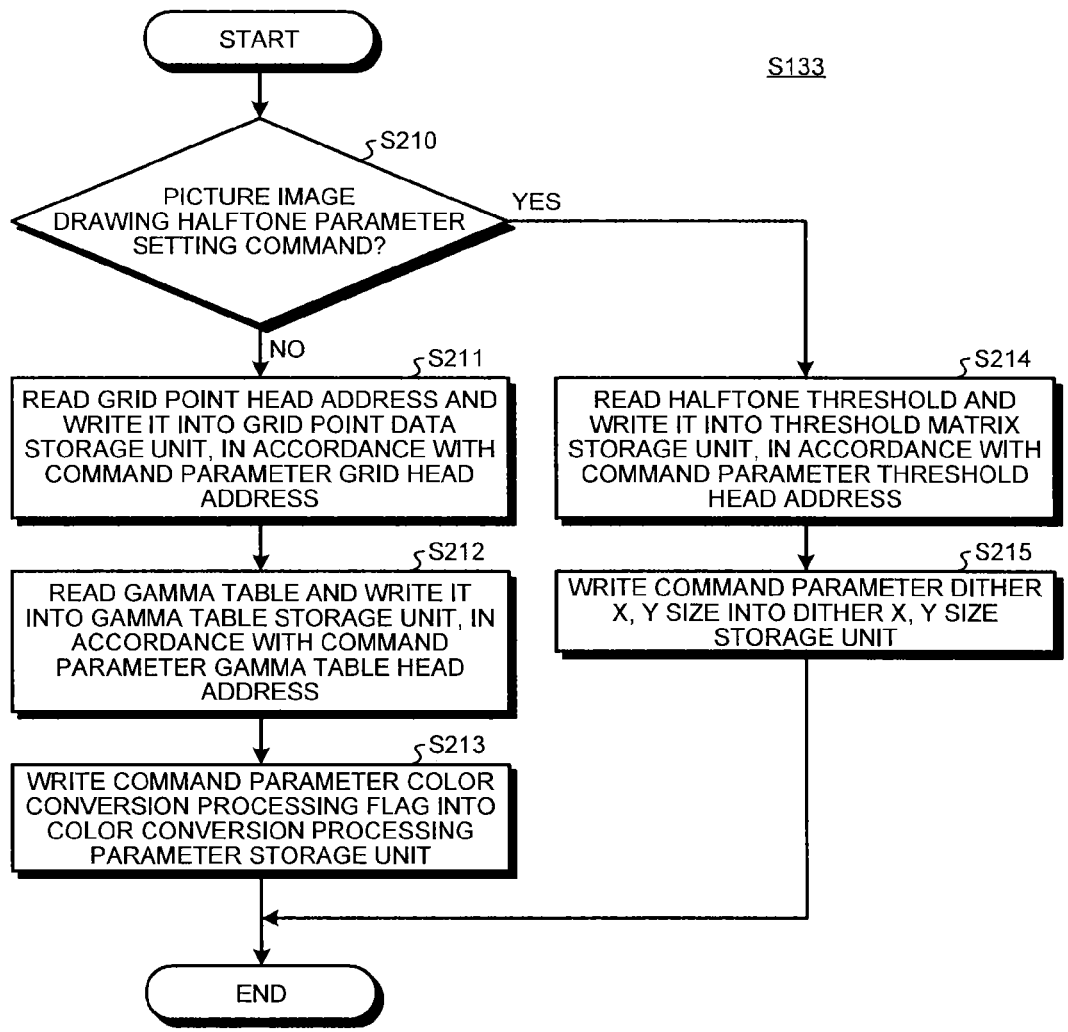
FIG. 14 is a flow chart illustrating an example of a picture image drawing parameter setting process.

FIG. 14 is a flow chart illustrating an example of setting process of the picture image drawing parameter at the step S133. At step S210, the command analyzing unit 101 judges whether the drawing command read at the step S100 is a halftone parameter command for picture image drawing as illustrated in FIG. 5(d). If it is judged that the drawing command is not the halftone parameter setting command for picture image drawing, the command analyzing unit 101 determines that the drawing command is a color conversion parameter setting command for picture image drawing as illustrated in FIG. 5(e). Thus, the process goes to step S211.

At step S211, the command analyzing unit 101 writes the grid point head address defined by the command into the DMA address generating unit 110 of the picture image drawing unit 102, and starts the DMA reading unit 111. The DMA reading unit 111 reads the grid data from the drawing command storage area of the main memory 72, and writes the grid data into the grid data storage unit 113. At the next step S212, the command analyzing unit 101 writes the gamma table head address defined by the drawing command into the DMA address generating unit 110, and starts the DMA reading unit 111. The DMA reading unit 111 reads the gamma table from the drawing command storage area of the main memory 72, and writes the gamma table into the gamma table storage unit 112. At the next step S213, the command analyzing unit 101 writes the color conversion processing flag defined by the command into the color conversion parameter storage unit 114.

On the other hand, at step S210, if it is judged that the read drawing command is the halftone parameter setting command for picture image drawing, the command analyzing unit 101 proceeds the process to step S214. At step S214, the command analyzing unit 101 writes the threshold head address defined by the command into the DMA address generating unit 110, and starts the DMA reading unit 111, so that the halftone threshold for picture image drawing is read sequentially from the drawing command storage area of the main memory 72, and written into the threshold matrix storage unit 117. At the next step S215, the command analyzing unit 101 writes the dither size in (X, Y) defined by the command into the dither X, Y size storage unit 116 of the picture image drawing unit 102.

If the processing from step S213 to step S215 is completed, the command analyzing unit 101 terminates a serried of processing illustrated by the flow chart in FIG. 14, and returns the process to the flow chart in FIG. 12.

Figure 15:
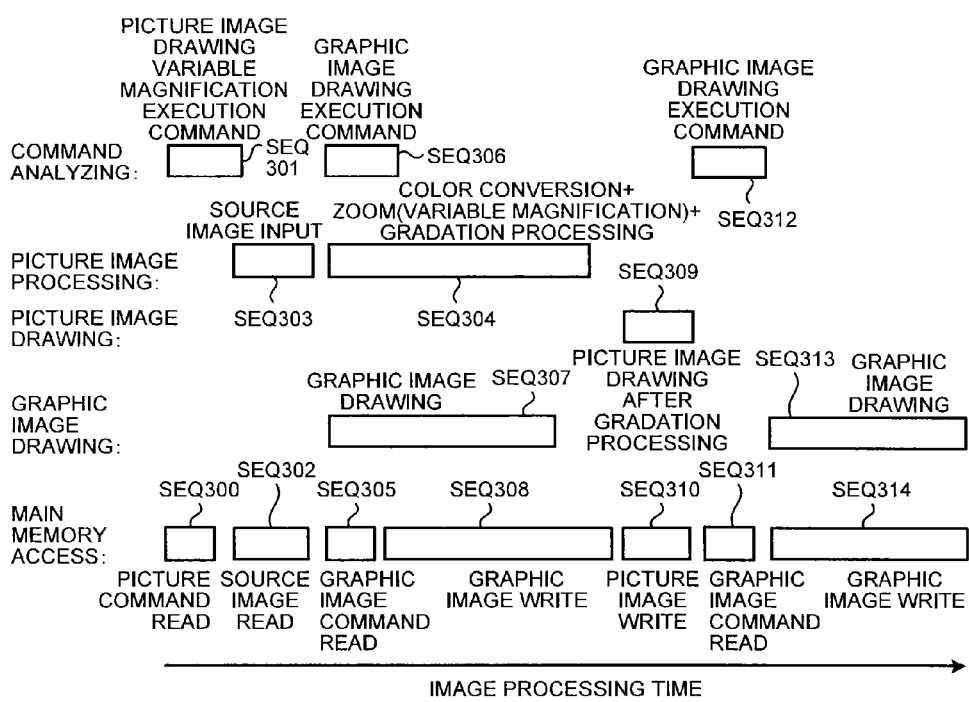
FIG. 15 is a timing chart illustrating timings of an exemplary drawing processing according to an embodiment.
Figure 16:
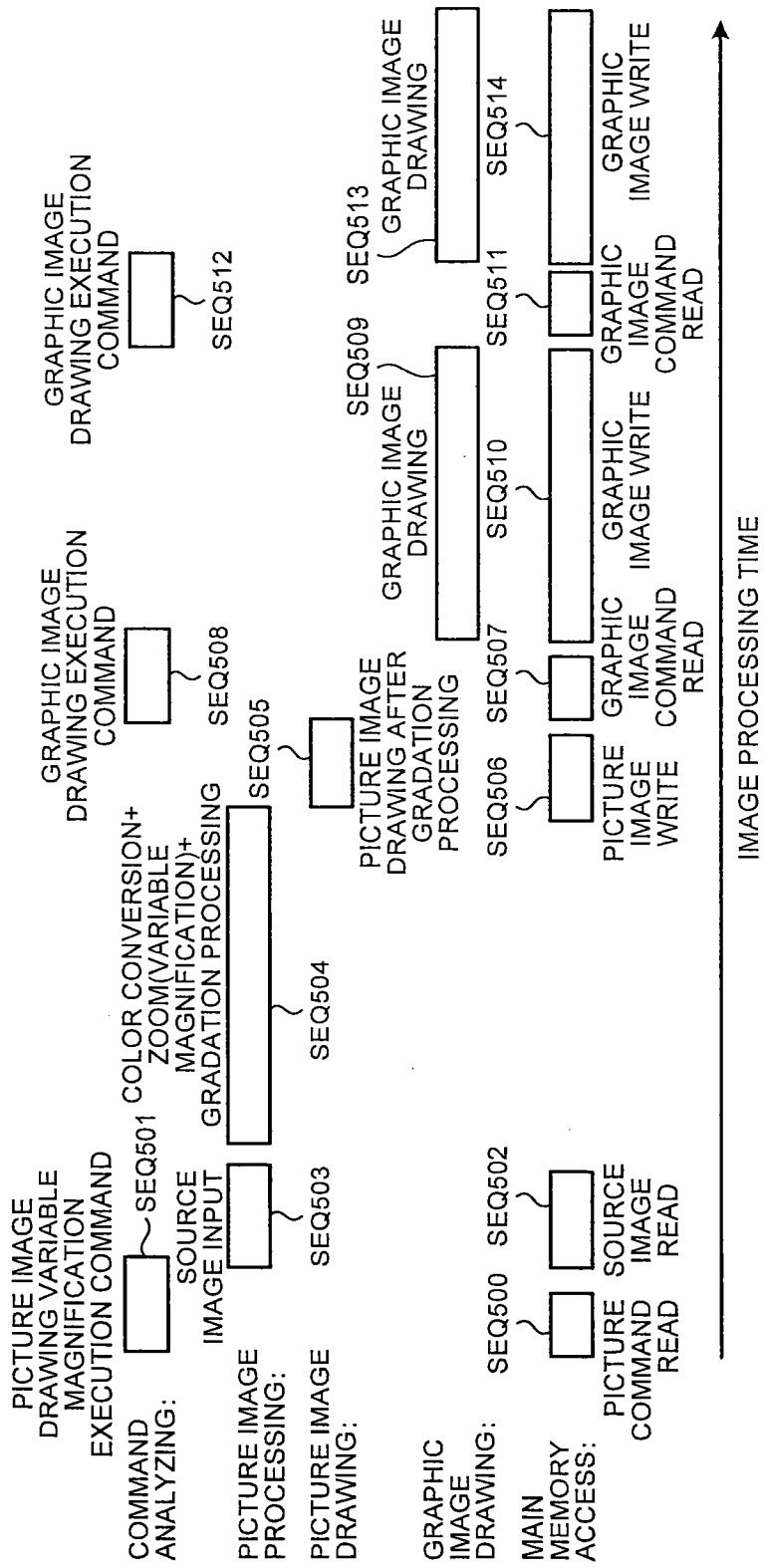
FIG. 16 is a timing chart illustrating timings of an exemplary drawing processing according to a conventional art.

FIG. 15 illustrates timings of an exemplary drawing process according to the present embodiment. With reference to FIG. 15 and the flow chart of FIG. 12, the drawing process according to the present embodiment is explained. Incidentally, herein, the drawing commands to execute the drawing are read by the command analyzing unit 101 in the order from the picture image drawing command, the graphic image drawing command #1, and the graphic image drawing command #2.

First, at SEQ 300, the command analyzing unit 101 reads the drawing command from the main memory 72. At SEQ 301, the command analyzing unit 101 obtains an analyzing result indicating that the read drawing command is the variable magnification execution command for picture image drawing (steps S100 and S110 in FIG. 12). The command analyzing unit 101 judges that the picture image drawing is not presently performed at step S111, and checks the image picture drawing area at step S113. Then, the command analyzing unit 101 judges that the graphic image drawing is not performed at the next step S114, and sets the drawing command parameter for the picture image drawing unit 102 at step S117, and starts the picture image drawing unit 118 at step S118.

When started, the picture image drawing unit 102 reads the source image from the main memory 72 in accordance with the set parameter(s) (SEQ 302). The source image is input to the picture image drawing unit 102, and one line of the source image is stored in the input line storage unit 126 (SEQ 303). In accordance with the set parameter(s), the picture image drawing unit 102 performs the color conversion processing on the input source image, and writes the processing result in the input line storage unit 126. This processing is performed for one line. As for the variable magnification (zoom) processing and the gradation processing, every time when the processing for one line is also performed, the processing result is written in the input line storage unit 126 (SEQ 304).

The color conversion processing, the variable magnification processing and the gradation processing in the picture image drawing unit 102 are performed without making an access to the main memory 72. Thereby, once the source image is read from the main memory 72, the access to the main memory 72 is not likely to be so crowded (become more readily available). Thereby, the command analyzing unit 101 reads the next drawing command at SEQ 305, and obtains the analyzing result indicating that the read drawing command is the graphic image drawing command #1 at SEQ 306 (steps S100 and S101 in FIG. 12). The command analyzing unit 101 judges that the graphic image drawing is not presently performed at step S102 in FIG. 12, and checks the graphic image drawing area at step S104.

Next, the command analyzing unit 101 judges whether the picture image drawing is presently performed at step S105 in FIG. 12. At this time point, the picture image drawing unit 102 is performing the image processing on the source image at SEQ 304, and does not draw the image on the main memory 72. Thereby, the command analyzing unit 101 judges that the picture image drawing is not performed, and sets the drawing command for the graphic image drawing unit 103, and starts the graphic image drawing unit 103 (steps S108 and S109 in FIG. 12). In accordance with the set graphic image drawing command, the graphic image drawing unit 103 performs the graphic image drawing processing at SEQ 307, and draws the graphic image on the main memory 72 at SEQ 308.

Once the drawing by the graphic image drawing unit 103 is completed, the access to the main memory is not likely to be so crowded (become more readily available). Thereby, the picture image drawing unit 102 performs the drawing processing of the picture image after gradation processing at SEQ 309, and draws the picture image on the main memory at SEQ 310. For example, the graphic image drawing unit 103 transfers the end signal indicating the completion of the drawing to the command analyzing unit 101, when the drawing ends. In response to this end signal, the command analyzing unit 101 informs a fact that the picture image drawing becomes available to the picture image drawing unit 102.

Once the picture image drawing ends, the access to the main memory 72 is not likely to be so crowded (become more readily available). Thereby, the command analyzing unit 101 reads the next drawing command at SEQ 311, and obtains the analyzing result indicating that the read drawing command is the graphic image drawing command at SEQ 312 (steps S100 and S101 in FIG. 12). The command analyzing unit 101 judges that the graphic image drawing is not presently performed at step S102 in FIG. 12, and checks the graphic image drawing area at step S104.

Then, the command analyzing unit judges that the picture image drawing is not performed at the judgment whether the picture image drawing is performed at step S105 in FIG. 12, and sets the drawing command for the graphic image drawing unit 103, and starts the graphic image drawing unit 103 (steps S108 and S109 in FIG. 12). In accordance with the set graphic image drawing command, the graphic image drawing unit 103 performs the graphic image drawing processing at SEQ 313, and draws the graphic image on the main memory 72 at SEQ 314.

Thus, according to the present embodiment, one drawing hardware processing can be executed in parallel with the other drawing hardware processing. More specifically, according to the present embodiment, if the access to the main memory is available, the processing based on the drawing command to start the other drawing hardware can be performed or executed without waiting the processing based on the drawing command to start one drawing hardware. Thereby, the access to the main memory can be efficiently done, and the processing speed improves.

Particularly, in the case that the gradation processing to limit the gradation is performed as in the picture image drawing unit 102, the data amount of the image after the gradation processing becomes smaller than the data amount of the input source image. Thus, the data amount to be written back in the main memory 72 decreases. Thereby, the access amount to the main memory 72 decreases. Thus, the parallel processing can be readily realized.

Furthermore, according to the present embodiment, even in a case that one drawing hardware performs the drawing on the main memory, if the area where the other drawing hardware performs the drawing does not overlap the area where the one drawing hardware performs the drawing, the drawing by the other drawing hardware can be performed. Thereby, the access to the main memory can be efficiently done.

According to the present invention, it is possible to realize the effective and efficient use of the memory into which the image is written.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing device, comprising:
a storage unit capable of storing various kinds of images;
a first drawing unit configured to write a source image in the storage unit, after the source image is subjected to an image processing by an image processing unit;
a second drawing unit configured to generate an image and write the generated image in the storage unit; and
an analyzing unit configured to analyze a page drawing command to obtain a command for any of the first drawing unit and the second drawing unit, so that the analyzing unit controls the first drawing unit in accordance with a first drawing command, when the analyzed command is the first drawing command to instruct the first drawing unit to write the source image, and the analyzing unit controls the second drawing unit in accordance with a second drawing command, when the analyzed command is the second drawing command to instruct the second drawing unit to write the generated image, wherein
while one of the first drawing unit and the second drawing unit writes a first image in a first drawing area of the storage unit, and the analyzing unit obtains a drawing command for the other of the first drawing unit and the second drawing unit, the analyzing unit judges whether the first drawing area overlaps a second drawing area of the storage unit in which a second image is to be written by the other drawing unit in accordance with the obtained drawing command for the other drawing unit, and
when the analyzing unit judges that the first drawing area does not overlap the second drawing unit, the analyzing unit controls the other drawing unit to start a writing processing to write the second image in the storage unit.

2. The image processing device according to claim 1, wherein
the analyzing unit analyzes the page drawing command without waiting a completion of an image writing by one of the first drawing unit and the second drawing unit, and
when the drawing command obtained from an analysis is the drawing command for the other of the first drawing unit and the second drawing unit, the analyzing unit judges whether the first drawing area overlaps the second drawing area.

3. The image processing device according to claim 1, wherein
when the analyzing unit judges that the first drawing area overlaps the second drawing area, the analyzing unit controls the other drawing unit to start the writing processing after a completion of the first image writing by the one drawing unit.

4. The image processing device according to claim 1, further comprising:

a first setting unit configured to set an image writing parameter for the first drawing unit in accordance with the first drawing command; and a second setting unit configured to set an image writing parameter for the second drawing unit in accordance with the second drawing command, wherein the first setting unit judges whether an image writing by the first drawing unit is completed, when it is judged that the image writing by the first drawing unit is completed, the first setting unit sets the image writing parameter, the second setting unit judges whether an image writing by the second drawing unit is completed, and when it is judged that the image writing by the second drawing unit is completed, the second setting unit sets the image writing parameter.

5. The image processing device according to claim 1, wherein the image processing unit performs at least one of a color conversion processing, a variable magnification processing, and a gradation processing on the source image.

6. The image processing device according to claim 1, wherein when the second drawing command instructs to draw a triangle image, the analyzing unit determines a square area circumscribed around the triangle image as the second drawing area.

7. The image processing device according to claim 1, wherein at least one of the first drawing unit and the second drawing unit is configured by hardware independent of the analyzing unit.

\* \* \* \* \*